(12) United States Patent
Hesketh et al.

(10) Patent No.: US 11,220,265 B2
(45) Date of Patent: Jan. 11, 2022

(54) STOP-IN-GEAR AUTO-START CONTROL

(71) Applicant: Ford Global Technologies, LLC, Dearborn, MI (US)

(72) Inventors: David Hesketh, Ingatestone (GB); Gary Paisley, Romford (GB); Dilli Poudel, Chigwell (GB); Chris Edward Pedlar, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/012,219

(22) Filed: Sep. 4, 2020

(65) Prior Publication Data

US 2021/0070297 A1    Mar. 11, 2021

(30) Foreign Application Priority Data

Sep. 6, 2019    (GB) .................... 1912864.4

(51) Int. Cl.
*B60W 30/18*    (2012.01)
*F02N 11/08*    (2006.01)
(Continued)

(52) U.S. Cl.
CPC ...... *B60W 30/18018* (2013.01); *B60W 10/02* (2013.01); *B60W 10/06* (2013.01);
(Continued)

(58) Field of Classification Search
CPC .......... B60W 30/18018; B60W 10/02; B60W 10/06; B60W 40/13; B60W 2510/0275; B60W 2510/1005; B60W 2510/0208; B60W 2510/18; B60W 2530/10; B60W 2540/12; B60W 2540/14; B60W 2540/16; B60W 2710/021; B60W 2710/06; F02N 11/0822; F02N 2200/102; F02N 2200/103; F02N 2200/0802

See application file for complete search history.

(56) References Cited

U.S. PATENT DOCUMENTS 8,280,608 B2 * 10/2012 Senda ............ B60W 30/18018
                                                 701/101
9,261,065 B2 *  2/2016 Christen ............ F02N 11/0822
(Continued)

FOREIGN PATENT DOCUMENTS

EP    2 014 910    1/2009
EP    2 223 835    9/2010

OTHER PUBLICATIONS

Machine translation of IDS cited art EP 2014910A1, filed May 17, 2021. (Year: 2021).*
GB Search Report dated May 5, 2020 of GB Application 1912864.4.

*Primary Examiner* — Tisha D Lewis
(74) *Attorney, Agent, or Firm* — Haley Guiliano LLP

(57) ABSTRACT

A method of controlling the engine of a vehicle having a stop-in-gear (SIG) stop-start system includes: a control module determining that a brake is being applied, based on an output from a brake sensor, and that a transmission is in an in-gear position, based on an output from a transmission sensor; and, while the brake is applied and the transmission is in an in-gear position, the control module causing the engine to start in response to detecting movement of a clutch pedal towards a released position based on an output from a clutch pedal sensor.

17 Claims, 5 Drawing Sheets

(51) Int. Cl.
  *B60W 10/02*   (2006.01)
  *B60W 10/06*   (2006.01)
  *B60W 40/13*   (2012.01)

(52) U.S. Cl.
  CPC ......... *B60W 40/13* (2013.01); *F02N 11/0822* (2013.01); *B60W 2510/0208* (2013.01); *B60W 2510/0275* (2013.01); *B60W 2510/1005* (2013.01); *B60W 2510/18* (2013.01); *B60W 2530/10* (2013.01); *B60W 2540/12* (2013.01); *B60W 2540/14* (2013.01); *B60W 2540/16* (2013.01); *B60W 2710/021* (2013.01); *B60W 2710/06* (2013.01); *F02N 2200/0802* (2013.01); *F02N 2200/102* (2013.01); *F02N 2200/103* (2013.01)

(56) References Cited

U.S. PATENT DOCUMENTS

| | | | |
|---|---|---|---|
| 10,363,935 B2* | 7/2019 | Bularz | F02N 11/0818 |
| 2010/0217493 A1* | 8/2010 | Tomura | B60W 10/02 |
| | | | 701/68 |
| 2016/0245203 A1* | 8/2016 | Petridis | F02N 11/10 |
| 2021/0140400 A1* | 5/2021 | Paisley | B60W 10/06 |

\* cited by examiner

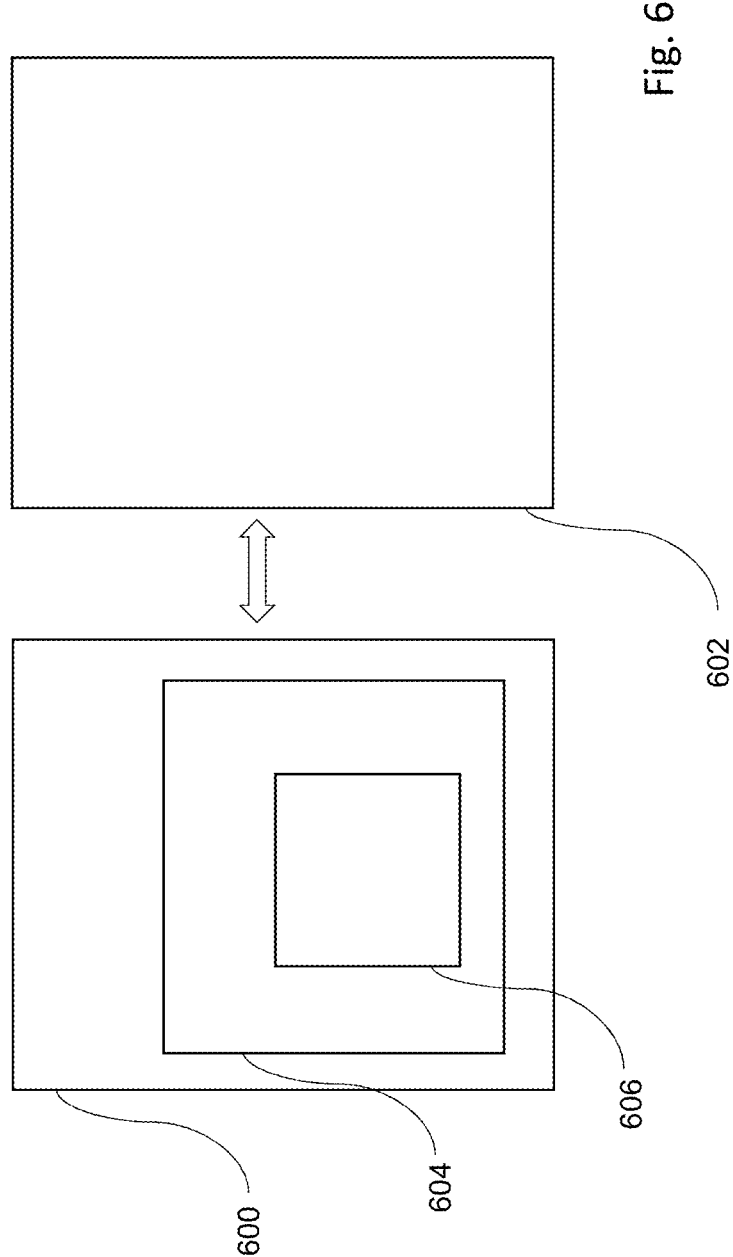

STOP-IN-GEAR AUTO-START CONTROL

CROSS REFERENCE TO RELATED APPLICATION

The present application claims priority to United Kingdom patent application number 1912864.4, filed on Sep. 6, 2019. The entire contents of the above-listed application are hereby incorporated by reference for all purposes.

FIELD

The present disclosure concerns vehicles having stop-in-gear (SIG) stop-start systems, methods of controlling such vehicles, control modules for such vehicles and related computer programs, non-transitory computer-readable media and data carrier signals.

SUMMARY

Some vehicles have automatic stop-start systems configured to automatically switch off an engine under certain "engine stop conditions" and to restart the engine under certain "engine start conditions". Automatic start-stop systems may be designed to reduce the fuel consumption of the vehicle, and to reduce $CO_2$ emissions, by automatically shutting down the engine when, according to certain conditions, it is determined that it is not necessary to keep the engine running. For example, stop-start systems can be configured to automatically stop the engine if the vehicle is not moving or if the vehicle is moving at a low speed.

Stop-in-neutral (SIN) stop-start systems are configured to stop the engine only if a transmission is in neutral (e.g., such that no gear is selected). Stop-in-gear (SIG) stop-start systems are, however, able to stop the engine when a transmission is in-gear (e.g., such that a gear is selected).

The appropriate engine stop and start conditions depend on the details of the particular stop-start system. SIN stop-start systems commonly: stop the engine when the transmission is moved to neutral and the clutch is released; and restart the engine when the clutch is depressed again prior to selecting a gear for take-off. SIG stop-start systems commonly: stop the engine when the brake is pressed and the clutch is depressed, while the transmission remains in-gear; and restart the engine when the brake is released prior to take-off. However, these typical stop and start conditions are not necessarily compatible with all driving styles and possible driver behaviours.

According to a first aspect, there is provided a method of controlling an engine of a vehicle having a stop-in-gear (SIG) stop-start system.

The vehicle comprises: a manual transmission having at least one in-gear position; a clutch interposed between the engine and the transmission, the clutch being operable in (a) a fully engaged clutch configuration in which the engine is driveably connected to the transmission by the clutch for the transfer of torque, (b) a partially engaged clutch configuration in which the engine is partially connected to the transmission by the clutch, the clutch having a limited torque transfer capacity in the partially engaged clutch configuration, and (c) a fully disengaged clutch configuration in which the engine is not driveably connected to the transmission; a driver-operable clutch pedal operably connected to the clutch for selecting the clutch configuration and movable between (i) a depressed position in which the clutch is in the fully disengaged configuration, (ii) a released position in which the clutch is in the fully engaged configuration, and (iii) a pressed position, intermediate the depressed and released positions, in which the clutch is in the partially engaged configuration; a brake applicable to exert a braking torque to impede movement of the vehicle; a clutch pedal sensor operable to measure a parameter indicative of clutch pedal position and/or movement; a brake sensor operable to measure a parameter indicative of brake application; a transmission sensor operable to measure a parameter indicative of the transmission position; and a control module.

The method comprises: the control module determining that the brake is being applied, based on an output from the brake sensor, and that the transmission is in an in-gear position, based on an output from the transmission sensor; and, while the brake is applied and the transmission is in an in-gear position, the control module causing the engine to start in response to detecting movement of the clutch pedal towards the released position based on an output from the clutch pedal sensor.

It will be appreciated that a stop-start system is a vehicle system for automatically stopping (e.g., auto-stopping) and automatically starting (e.g., auto-starting) the engine used to provide motive power to the vehicle. It will be further appreciated that a SIG stop-start system is a system configured to enable auto-stopping of the engine when the transmission is in-gear. A SIG stop-start system may enable auto-stopping of the engine while the vehicle is moving (e.g. at, typically, a low speed) and the transmission is in-gear and/or while the vehicle is stationary and the transmission is in-gear. In existing SIG stop-start vehicles, auto-stopping is typically triggered when the clutch is fully disengaged (e.g., by depressing the clutch pedal) and the brake is applied. Auto-starting of the engine is then typically triggered when a driver releases the brake.

A SIG stop-start system may be contrasted with a stop-in-neutral (SIN) stop-start system configured only to enable auto-stopping of the engine when the transmission is in neutral. In existing SIN stop-start vehicles, auto-stopping is typically triggered when the transmission is in neutral and the clutch is fully engaged (e.g., by releasing the clutch pedal). Auto-starting of the engine is then typically triggered when a driver disengages the clutch (e.g., by depressing the clutch pedal) prior to selecting a new gear.

Drivers can operate SIN stop-start vehicles in substantially the same manner as they would vehicles not equipped with stop-start systems, and the SIN stop-start vehicles will typically behave as expected. For the most part, drivers can also apply the same driving strategies when operating SIG stop-start vehicles as they would when operating vehicles not equipped with stop-start systems. However, the inventors have identified a particular driving strategy which, under certain conditions, could result in existing SIG stop-start vehicles behaving differently from vehicles not equipped with a stop-start system. Such behaviour could be dangerous and/or could discourage drivers from using the stop-start functionality of SIG stop-start vehicles, which would be undesirable given the environmental and economic benefits of SIG stop-start systems.

In particular, some drivers choose to control take-off of a vehicle, particularly when stopped on a slope, using only the clutch pedal and the brake pedal. That is to say, these drivers do not make use of additional braking facilities such as a parking brake (e.g., a hand brake or emergency brake) or an automated braking system to control the vehicle's movement when taking off on a slope. In a vehicle not equipped with a stop-start system, such a driver will apply the brake using the brake pedal to hold the vehicle in position while the clutch pedal is raised from the depressed position to a pressed position in which the clutch reaches a partially engaged clutch configuration (e.g. the "bite" point), at which point the brake is progressively released to enable the engine to drive movement of the vehicle. Such a method can also be used to operate a vehicle having a SIN stop-start system, since the auto-stopped engine will auto-start as the clutch is depressed to put the vehicle into gear before take-off is commenced. However, this driving method is not compatible with existing SIG stop-start vehicles because the engine auto-start is only triggered by release of the brake. A SIG stop-start vehicle controlled in such a way is therefore at risk of inadvertently rolling down the slope under the action of gravity when take-off is attempted. This is both dangerous and frustrating for the driver, who will not understand why the vehicle is not behaving as expected.

This problem is, however, overcome by the method of the present disclosure. In particular, the inventors have realised that movement of the clutch pedal towards the released position, when the vehicle is auto-stopped, is indicative of a driver's intention to take off. Accordingly, by causing the engine to start in response to detecting movement of the clutch pedal towards the released position while the brake is applied and the transmission is an in-gear position, the engine can be auto-started before the clutch engages (e.g. before the clutch reaches the "bite point") and therefore before the driver will have released the brake pedal. The driver can therefore safely control movement of the vehicle in the usual way by concurrently controlling the clutch pedal and the brake pedal positions without unexpected movement of the vehicle, for example in the wrong direction. This innovation will enable increased use of SIG stop-start systems, which will have benefits for the environment and in terms of fuel economy.

Accordingly, the method may comprise: while the brake is applied, the transmission is in an in-gear position and a parking brake (e.g. hand brake) is not applied, the control module causing the engine to start in response to detecting movement of the clutch pedal towards the released position based on an output from the clutch pedal sensor.

The transmission may be multi-speed transmission. For example, the transmission may have more than one in-gear position. It will be appreciated that an in-gear position is a position in which a gear forming part of the transmission is selected such that drive from the engine can be transmitted by the transmission. The transmission may also have a neutral position. It will be appreciated that the neutral position is a position in which no gear is selected such that drive from the engine cannot be transmitted by the transmission. The vehicle may comprise a gear selector, such as a gear stick or gearshift, movable (for example, between several different positions) for selecting the position of the transmission (e.g., selecting the gear).

The clutch pedal may be mechanically, electronically or hydraulically connected to the clutch for controlling the clutch configuration. For example, the clutch pedal may be operable to control movement of the clutch between the fully engaged, partially engaged and fully disengaged configurations.

The vehicle may comprise a driver-operable brake pedal operably connected (e.g. mechanically, electronically or hydraulically connected) to the brake for applying and releasing said brake.

It will be appreciated that, throughout this specification and the appended claims, the term "pedal" (for example, in reference to the "clutch pedal" or "brake pedal"), while typically referring to a lever operated by the driver's foot, may also encompass any other form of lever or actuator operable to control the corresponding functionality (e.g., the clutch or the brake) of the vehicle. For example, a pedal may be a hand lever.

It will also be appreciated that, when the clutch is operated in the fully engaged clutch configuration, the torque transfer capacity of the clutch (e.g., the maximum amount of torque which can be transferred by the clutch in the said configuration without the clutch slipping) is at a maximum. When the clutch is operated in the partially engaged clutch configuration, the torque transfer capacity of the clutch is limited in the sense that the torque transfer capacity is less than the maximum achievable in the fully engaged configuration. When the clutch is operated in the fully disengaged clutch configuration, the torque transfer capacity is negligible, e.g., zero or approximately zero.

It may be that the clutch pedal is movable from 0% to 100% of a maximum clutch pedal travel distance. It may be that the released position corresponds to a position of the clutch pedal which is greater than or equal to 0% and less than a first threshold percentage of the maximum clutch pedal travel distance. It may be that the pressed position corresponds to a position of the clutch pedal which is greater than or equal to the first threshold percentage and less than a second threshold percentage of the maximum clutch pedal travel distance. It may be that the depressed position corresponds to a position of the clutch pedal which is greater than or equal to the second threshold percentage and no greater than 100% of the maximum clutch pedal travel distance. The second threshold percentage is typically greater than the first threshold percentage.

It may be that the first threshold percentage is from about 5% to about 20%, for example about 10% (e.g., of the maximum clutch pedal travel distance). It may be that the second threshold percentage is from about 70% to about 80%, for example about 75% (e.g., of the maximum clutch pedal travel distance).

The clutch pedal sensor may be a position sensor, for example a rotary position sensor. The clutch pedal sensor (e.g., the position sensor, for example the rotary position sensor) may be located at, for example on or adjacent, the clutch pedal.

It may be that movement of one or more clutch components is actuated (e.g., locally at the clutch) by a hydraulic cylinder. For example, the vehicle may comprise a hydraulic slave cylinder coupled to a hydraulic master cylinder. Movement of a piston within the hydraulic master cylinder may be controlled by operation of the clutch pedal. The hydraulic master cylinder may convert a force applied to the clutch pedal into a hydraulic pressure which is transmitted to the hydraulic slave cylinder to drive movement of the one or more clutch components (e.g., to vary the clutch configuration).

The clutch pedal sensor may be a displacement sensor, for example a linear displacement sensor. The displacement sensor (for example, the linear displacement sensor) may be coupled to and/or located at, for example on or adjacent, the hydraulic cylinder. For example, the displacement sensor (for example, the linear displacement sensor) may be coupled to and/or located at the hydraulic master cylinder. Displacement of the piston within the hydraulic master cylinder is typically directly indicative of the position of the clutch pedal.

The clutch pedal sensor may be operable (e.g. configured) to determine the position of the clutch pedal between either end of its maximum possible travel. That is to say, the clutch pedal sensor may be operable (e.g. configured) to determine whether the clutch pedal is in one of the depressed position, the pressed position or the released position. Accordingly, the output from the clutch pedal sensor may be an output indicative of (e.g. a measurement of) the clutch pedal position. The output from the clutch pedal sensor may be an electrical signal.

The clutch pedal sensor may be operable (e.g. configured) to determine the speed of movement of the clutch pedal. The clutch pedal sensor may additionally be operable (e.g. configured) to determine the direction of movement of the clutch pedal. That is to say, the clutch pedal sensor may be operable (e.g. configured) to determine whether the clutch pedal is moving between the depressed position, the pressed position and/or the released position (for example, whether the clutch pedal is moving from the depressed position to the pressed position). Accordingly, the output from the clutch pedal sensor may be an output indicative of (e.g. a measurement of) the speed and/or direction (e.g. the velocity) of movement of the clutch pedal.

It may be that the clutch pedal sensor is operable (e.g. configured) to determine both the position of the clutch pedal and the speed, and optionally the direction (e.g. velocity), of movement of the clutch pedal. Accordingly, the output from the clutch pedal sensor may be an output indicative of (e.g. a measurement of) the position and the speed, and optionally the direction (e.g. velocity), of movement of the clutch pedal.

It may be that the vehicle comprises a plurality of (e.g. two) clutch pedal sensors, each clutch pedal sensor being operable to measure a respective or the same parameter indicative of clutch pedal position and/or movement. The method may comprise the control module causing the engine to start in response to detecting movement of the clutch pedal towards the released position based on one or more outputs from the plurality of clutch pedal sensors.

It may be that the vehicle comprises a clutch sensor, e.g., in addition to the clutch pedal sensor(s). The clutch sensor may be operable to measure a parameter indicative of the clutch configuration. For example, the clutch sensor may be operable to measure a parameter indicative of a position (e.g. an absolute or relative position) of one or more clutch components. The clutch sensor may be operable to measure a parameter indicative of the instantaneous clutch torque transfer capacity, e.g., the clutch torque transfer capacity of the clutch at a given instant in time (e.g., in a given clutch configuration).

The clutch sensor may be operable to measure a parameter indicative of hydraulic pressure in the clutch slave cylinder. Hydraulic pressure in the clutch slave cylinder is typically directly indicative of the instantaneous clutch configuration and/or the instantaneous clutch torque transfer capacity. Accordingly, the clutch sensor may be a clutch slave cylinder sensor.

The clutch sensor may be operable to measure a parameter indicative of pressure acting on a clutch thrust bearing. Pressure acting on the clutch thrust bearing is typically directly indicative of the instantaneous clutch configuration and/or the instantaneous clutch torque transfer capacity. Accordingly, the clutch sensor may be a clutch thrust bearing pressure sensor.

It may be that the method comprises: the control module determining that the clutch is in the fully disengaged clutch configuration (e.g., such that the instantaneous clutch torque transfer capacity is negligible, e.g., effectively zero) based on an output from the clutch sensor (e.g. the clutch slave cylinder sensor); and, while the brake is applied, the transmission is in an in-gear position and the clutch is in the fully disengaged clutch configuration (e.g., the instantaneous clutch torque capacity is negligible, e.g., effectively zero), the control module causing the engine to start in response to detecting movement of the clutch pedal towards the released position based on the output from the clutch pedal sensor(s).

By causing the engine to start in response to detecting movement of the clutch pedal towards the released position while the brake is applied, the transmission is in an in-gear position and the clutch is in the fully disengaged clutch configuration, the clutch typically engages only after the engine has been auto-started, such that the risk of inadvertently causing movement of the vehicle is minimised. That is to say, such a method typically ensures that the drivetrain of the vehicle is open when the engine is auto-started.

It may be that the method comprises: the control module determining that the clutch is in the partially engaged clutch configuration (e.g., such that instantaneous clutch torque transfer capacity is non-zero but limited) based on an output from the clutch sensor (e.g., the clutch slave cylinder sensor) and that the braking torque is sufficient to impede (e.g. prevent) movement of the vehicle; and, while the brake is applied, the transmission is in an in-gear position, the clutch is in the partially engaged clutch configuration (e.g., the instantaneous clutch torque transfer capacity is non-zero but limited) and the braking torque is sufficient to impede (e.g. prevent) movement of the vehicle, the control module causing the engine to start in response to detecting movement of the clutch pedal towards the released position based on the output from the clutch pedal sensor(s).

By causing the engine to start in response to detecting movement of the clutch pedal towards the released position while the brake is applied, the transmission is in an in-gear position, the clutch is in the partially engaged clutch configuration and the braking torque is sufficient to impede (e.g. prevent) movement of the vehicle, auto-starting of the engine at pressed (e.g., not fully depressed) clutch pedal positions is made achievable while maintaining a reduced risk of unintended vehicle movement. In other words, it is possible to safely auto-start the engine under more relaxed clutch engagement conditions by actively taking into consideration the amount of braking torque exerted by the brake.

It may be that the method comprises: the control module taking into account one or more of a hydraulic brake pressure, the clutch pedal position, the clutch configuration, the instantaneous clutch torque transfer capacity, a vehicle mass and a vehicle orientation (for example, a gradient (e.g., slope) of a surface on which the vehicle is situated) in determining that the braking torque is sufficient to impede (e.g. prevent) movement of the vehicle.

For example, the method may comprise determining (e.g. estimating or calculating) that a resultant force acting on the vehicle is insufficient to cause movement of the vehicle. The amount of braking torque exerted by the brake may be determined (e.g. estimated or calculated) based on the hydraulic brake pressure. The vehicle mass may be known or may be determined (e.g. estimated or calculated), for example based on measurements of vehicle acceleration and torque made prior to auto-stopping the vehicle. The vehicle orientation may be known or may be determined (e.g. estimated, measured or calculated), for example based on one or more outputs from one or more vehicle orientation sensors. For example, a longitudinal acceleration sensor may be used to determine the gradient (e.g., slope) of the surface on which the vehicle is situated. The inventors have found that for a given vehicle mass, vehicle orientation (e.g., gradient of the surface on which the vehicle is situated) and braking torque, it is possible to determine whether the instantaneous clutch torque transfer capacity (corresponding to a particular clutch configuration and/or clutch pedal position) would be sufficient to impede (e.g. prevent) movement of the vehicle if the engine were restarted without further movement of the clutch pedal and the brake pedal.

In any method described herein, detecting movement of the clutch pedal towards the released position may comprise comparing the (e.g., instantaneous) clutch pedal position, determined based on the output from clutch pedal sensor(s), to a previous clutch pedal position and thereby determining that the clutch pedal has moved towards the released position. For example, the method may comprise: determining (e.g. measuring) the clutch pedal position (for example, relative to the maximum possible travel of the clutch pedal) at a first instance; determining (e.g. measuring) the clutch pedal position (for example, relative to the maximum possible travel of the clutch pedal) at a second instance; and determining (e.g. calculating) the distance (e.g., the difference) between the clutch pedal positions determined (e.g. measured) at the first and second instances. Detecting movement of the clutch pedal towards the released position may comprise determining (e.g. calculating) that the distance travelled by the clutch pedal (e.g., the distance (e.g., difference) between the clutch pedal positions determined (e.g. measured) at the first and second instances) exceeds a threshold. Detecting movement of the clutch pedal towards the released position may further comprise determining the direction in which the clutch pedal has travelled, e.g. by determining the sign of the difference between the clutch pedal positions determined (e.g. measured) at the first and second instances.

It may be that the previous clutch pedal position is the most depressed clutch pedal position achieved since the engine was most recently stopped. For example, the method may comprise measuring the most depressed clutch pedal position achieved since the engine was most recently stopped and storing that position in a memory. The value of the most depressed clutch pedal position stored in the memory may be updated iteratively. For example, the clutch pedal position may be measured repeatedly, for example at regular intervals, or continuously. The clutch pedal position measured at any given point in time may be compared to the value of the most depressed clutch pedal position stored in the memory at that point in time and, if the instantaneous clutch pedal position is more depressed than the value stored in the memory, the value stored in the memory may be replaced by the instantaneous clutch pedal position. The value stored in the memory may be cleared or reset each time the engine is auto-started. In that way, the value stored in the memory at any given time, when the engine is in an auto-stopped state, will correspond to the most depressed clutch pedal position achieved since the engine was stopped. Accordingly, it may be that determining that the clutch pedal position has moved towards the released position comprises determining that a distance (e.g., difference) between the instantaneous clutch pedal position and the most depressed clutch pedal position previously measured (e.g., since the engine was most recently stopped) exceeds a threshold.

By comparing the instantaneous clutch pedal position to the most depressed clutch pedal position achieved since the engine was most recently stopped, rather than comparing it to a fixed clutch pedal position (e.g. such as fully (e.g., 100%) depressed), the method may take into account variation in the driver's strength and bodily dimensions (e.g. foot size).

Additionally or alternatively, detecting movement of the clutch pedal towards the released position may comprise determining that a speed of movement of the clutch pedal towards the released position, based on the output from the clutch sensor, exceeds a threshold. Relatively slow movements of the clutch pedal (even in the direction of the released position), at a speed below the threshold, may not be indicative of a driver's intention to take off. For example, relatively slow movements of the clutch pedal may simply occur gradually as the driver's leg and foot tire from holding down the clutch pedal. In contrast, relatively fast movements of the clutch pedal (in the direction of the released position), at a speed exceeding the threshold, are more likely to be indicative of a driver's intention to take off.

Detecting movement of the clutch pedal towards the released position may comprise determining that a speed of movement of the clutch pedal towards the released position, based on the output from the clutch sensor, exceeds a first threshold but does not exceed a second threshold, the second threshold being greater than the first threshold. Relatively slow movements of the clutch pedal (even in the direction of the released position), at a speed below the first threshold, may not be indicative of a driver's intention to take off. For example, relatively slow movements of the clutch pedal may simply occur gradually as the driver's leg and foot tire from holding down the clutch pedal. In contrast, relatively fast movements of the clutch pedal (in the direction of the released position), at a speed exceeding the first threshold but not exceeding the second threshold, are more likely to be indicative of a driver's intention to take off. In addition, very fast movements of the clutch pedal (in the direction of the released position), at a speed exceeding the second threshold, may be indicative of a driver's intention to remove their foot entirely from the clutch pedal without the intention of taking off.

It will be appreciated that the stop-start system may also be configured to auto-start the engine when alternative predefined engine start conditions are met. For example, under different conditions, the stop-start system may start the engine in response to detecting release of the brake based on an output from the brake sensor. Accordingly, the method may comprise the control module causing the engine to start in response to determining that a first predefined engine start condition, of a plurality of predefined engine start conditions, is met. The first predefined engine start condition may require the brake to be applied, the transmission to be in an in-gear position and the detection of movement of the clutch pedal towards the released position. The plurality of predefined engine start conditions may also include a second predefined engine start condition which requires the transmission to be in an in-gear position, optionally the clutch pedal to be depressed and/or the clutch to be in the fully disengaged configuration, and detection of the brake being released.

The brake sensor may be any sensor operable (e.g. configured) to measure a position of the brake pedal and/or to determine whether pressure has been applied to the brake pedal to apply the brake. The brake may be a hydraulic brake and the brake pedal sensor may be operable (e.g. configured) to measure a parameter indicative of a pressure of fluid in one or more brake lines (for example, in a secondary brake circuit). For example, the brake sensor may be a displacement sensor, for example a linear displacement sensor. The displacement sensor (for example, the linear displacement sensor) may be coupled to and/or located at, for example on or adjacent, a brake cylinder such as a brake master cylinder. Alternatively, the brake sensor may be a position sensor, for example a rotary position sensor, operable to measure a parameter indicative of the position and/or speed of movement of the brake pedal. Accordingly, the brake sensor (e.g. the position sensor) may be located at, for example on or adjacent, the brake pedal. Further alternatively, the brake sensor may be a pressure sensor operable to measure a parameter indicative of pressure applied to the brake pedal. Further alternatively, the brake sensor may be operable to measure the brake torque applied by the brake to a wheel rotor.

The transmission sensor may be operable (e.g. configured) to determine the state of the transmission. The transmission sensor may be operable (e.g. configured) to determine whether the transmission is in a neutral position or in an in-gear position. The transmission sensor may be operable (e.g. configured) to determine which in-gear position, of a plurality of in-gear positions, the transmission is in. The transmission sensor may be located at (e.g. incorporated into) the gear selector.

It will be appreciated that, throughout this specification and the appended claims, the control module may comprise physical hardware (e.g. a processor and/or device, for example an on-board computer), software (e.g. a computer program running on a processor), or a combination thereof. The control module may comprise (e.g. be) an electronic control unit (ECU). The control module may comprise or be in electronic communication with a memory.

It may be that the vehicle is a motor vehicle (for example a car, e.g., an automobile, van or truck, etc.) or an industrial or agricultural vehicle (e.g., a tractor, forklift, bulldozer, excavator, etc.).

In a second aspect, there is provided a computer program comprising instructions to cause a control module of a vehicle to carry out the method according to the first aspect.

The control module and/or the vehicle may have any of the features described hereinabove with reference to the first aspect.

In a third aspect, there is provided a non-transitory computer-readable medium storing, or a data carrier signal carrying, the computer program according to the second aspect.

The computer program may be stored or carried as computer-executable program code.

The non-transitory computer-readable medium may be the memory of or in electronic communication with the control module of the first aspect.

In a fourth aspect, there is provided a control module (a) configured (e.g. programmed) to carry out the method according to the first aspect or (b) running the computer program according to the second aspect or stored or carried on the non-transitory computer-readable medium or data carrier signal of the third aspect.

The control module may have any of the features described hereinabove with reference to the first aspect.

In a fifth aspect, there is provided a vehicle having a stop-in-gear (SIG) stop-start system.

The vehicle comprises: an engine; a manual transmission having at least one in-gear position; a clutch interposed between the engine and the transmission, the clutch being operable in (a) a fully engaged clutch configuration in which the engine is driveably connected to the transmission by the clutch for the full transfer of torque, (b) a partially engaged clutch configuration in which the engine is partially connected to the transmission by the clutch, the clutch having a limited torque transfer capacity in the partially engaged clutch configuration, and (c) a fully disengaged clutch configuration in which the engine is not driveably connected to the transmission; a driver-operable clutch pedal operably connected to the clutch for selecting the clutch configuration and movable between (i) a depressed position in which the clutch is in the fully disengaged configuration, (ii) a released position in which the clutch is in the fully engaged configuration and (iii) a pressed position, intermediate the depressed and released positions, in which the clutch is in the partially engaged configuration; a brake applicable to exert a braking torque to impede movement of the vehicle; a clutch pedal sensor operable to measure a parameter indicative of clutch pedal position and/or movement; a brake sensor operable to measure a parameter indicative of brake application; a transmission sensor operable to measure a parameter indicative of the transmission position; and a control module according to the fourth aspect.

The vehicle, SIG stop-start system, engine, transmission, clutch, clutch pedal, brake, clutch pedal sensor, brake sensor, transmission sensor and control module may each have any features described hereinabove with reference to the first, second, third or fourth aspects.

Indeed, for the avoidance of doubt, the skilled person will appreciate that, except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

BRIEF DESCRIPTION OF THE DRAWINGS

Embodiments will now be described by way of example only, with reference to the Figures, in which:

FIG. 6 shows an example machine-readable medium in communication with a processor.

DETAILED DESCRIPTION

Figure 1:
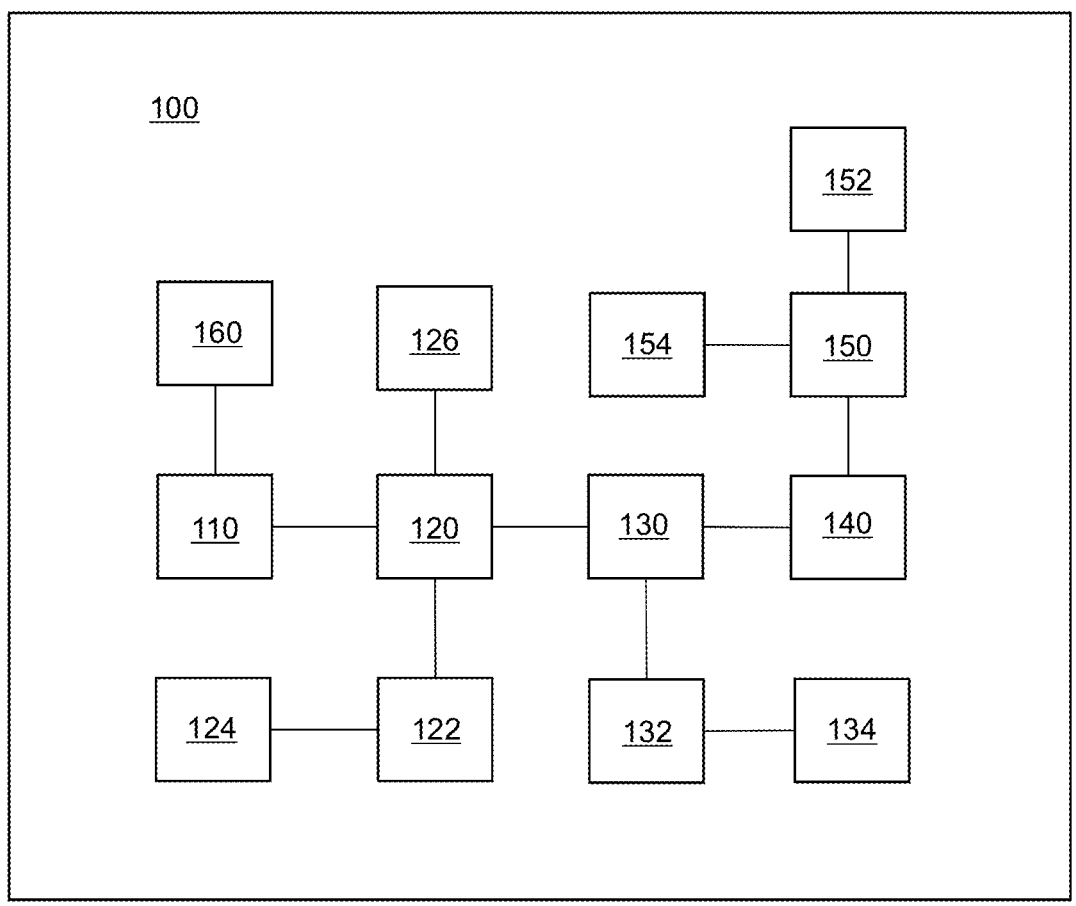
FIG. 1 is a schematic drawing of a vehicle.

With reference to FIG. 1, an example vehicle 100 includes an engine 110 (e.g. an internal combustion engine) driveably connected to a multi-speed transmission (e.g., gearbox) 130 by way of a clutch 120. The clutch may be manually engaged or released by a driver of the vehicle by way of a clutch pedal 122. The transmission position may be selected by a driver by way of a gear selector 132. The transmission is driveably connected to wheels 140 for driving movement of the vehicle 100. The vehicle 100 also includes brakes 150 operably connected to the wheels 140 for reducing the speed of movement of the vehicle 100. The brakes 150 may be selectively applied by a driver of the vehicle 100 by way of a brake pedal 152.

The clutch 120 is operable in three different states/configurations. In a fully engaged clutch state/configuration, the engine 110 is driveably connected to the transmission 130 by the clutch 120 for the transfer of torque. In a partially engaged clutch state/configuration, the engine 110 is partially connected to the transmission 130 by the clutch 120. That is to say, the clutch 120 has limited torque transfer capacity in the partially engaged clutch configuration. In a fully disengaged clutch state/configuration, the engine 110 is not driveably connected to the transmission 130.

The position of the clutch pedal 122 is variable. In particular, the clutch pedal 122 is continuously movable between positions which correspond to the three different possible configurations of the clutch 120. In a depressed position, corresponding to from about 75% to about 100% of the maximum possible extent of travel of the clutch pedal 122, the clutch 120 is in the fully disengaged configuration. In a released position, corresponding to from about 0% to about 20% of the maximum possible extent of travel of the clutch pedal 122, the clutch 120 is in the fully engaged configuration. In a pressed position, corresponding to between about 20% to about 75% of the maximum possible extent of travel of the clutch pedal 122, intermediate the depressed and released positions, the clutch 120 is in the partially engaged configuration.

The transmission 130 is operable in one of a plurality of positions (or "states") corresponding to the selection of a gear or lack thereof. For example, when the transmission 130 is in an in-gear position or state, drive from the engine 110 can be transmitted to the wheels 140 by the transmission 130. When the transmission 130 in a neutral position or state, drive from the engine 110 cannot be transmitted to the wheels 140. The gear selector 132 is movable between a plurality of positions including at least one in-gear position, in which the transmission 130 is in an in-gear position or state (e.g., such that a gear is selected), and a neutral position, in which the transmission 130 is in a neutral position or state (e.g., such that no gear is selected).

The vehicle also includes a clutch pedal sensor 124, a clutch sensor 126, a transmission sensor 134 and a brake sensor 154. The clutch pedal sensor 124 is operable to measure a parameter indicative of the clutch pedal position, for example along its maximum possible extent of travel. The clutch sensor 126 is operable to measure a parameter indicative of the configuration of the clutch 120, such as the displacement of a clutch slave cylinder (not shown). The transmission sensor 134 is operable to measure a position of the transmission 130, for example a selected in-gear or neutral position. The brake sensor 154 is operable to measure a parameter indicative of application of the brakes 150, such as a pressure in a hydraulic brake line (not shown).

The vehicle 100 also comprises a control module 160, such as an electronic control unit (ECU). The control module 160 is configured (e.g. programmed) to control the operation of the engine 110. In particular, the control module 160 is operable to selectively start and stop the engine 110 without driver intervention, for example when one or more predetermined conditions exist. For example, the control module 160 is configured to stop the engine 110 when one or more predetermined stop conditions exist and to start the engine 110 when one or more predetermined start conditions exist.

The control module 160 is also configured to receive outputs from each of the clutch pedal sensor 124, the clutch sensor 126, the transmission sensor 134 and the brake sensor 154. In general, the predetermined stop and start conditions include one or more conditions of the clutch 120, the clutch pedal 122, the transmission 130, the gear selector 132, the brakes 150 and/or the brake pedal 152. Accordingly, the control module 160 is configured (e.g. programmed) to monitor the state of the clutch 120, the clutch pedal 122, the transmission 130, the gear selector 132, the brakes 150 and/or the brake pedal 152.

In more detail, the control module 160 is configured (e.g. programmed) to measure, monitor, and/or determine one or more of the following: whether the transmission 130 is in a neutral positions or state or an in-gear position or state; the position of the brake pedal 152 and/or whether the brakes are being applied; the position and/or movement of the clutch pedal 122 (for example, to determine whether the clutch pedal 122 is depressed, pressed or released); and/or the configuration of the clutch 120 (for example, the instantaneous clutch torque transfer capacity of the clutch 120).

The vehicle 100 shown in FIG. 1 is provided with a stop-in-gear (SIG) stop-start system. This means that the control module 160 is configured (e.g. programmed) to stop the engine 110 when the transmission 130 is in an in-gear position or state, the clutch pedal 122 is depressed (e.g., such that the clutch 120 is in the fully disengaged configuration) and the brakes 150 are being applied. The predetermined conditions for stopping the engine will not be discussed in more detail herein, as the examples are primarily concerned with the predetermined conditions for restarting the engine (e.g., when already auto-stopped).

In general, the control module 160 is configured (e.g. programmed) to start the engine 110 (e.g., when auto-stopped) when the transmission 130 is in-gear if (a) the brake pedal 152 is released or (b) an indication that the driver nevertheless intends to take off is detected. The indication that the driver intends to take off is typically detected by monitoring the clutch pedal 122 position.

In a first example, the control module 160 is configured (e.g. programmed) to start the engine 110 if, when the transmission 130 is in-gear and the brakes 150 are applied, the clutch pedal 120 is moved from a depressed position towards the released position. Movement of the clutch pedal 120 towards the released position is indicative of a driver's intention to take off. Triggering restarting of the engine when detecting that the clutch pedal is being moved towards the released position, as an alternative to using movement of brake pedal as a restart trigger, enables the engine to be restarted before the driver releases the brakes, reducing the likelihood of unintended movement of the vehicle (for example, where the vehicle is positioned on a slope).

In a second example, the control module 160 is configured (e.g. programmed) to start the engine 110 if, when the transmission 130 is in-gear and the brakes 150 are applied, the clutch pedal 120 is moved from a depressed position towards the released position and the clutch 120 is in the fully disengaged configuration. Requiring the clutch 120 to be in the fully disengaged configuration as a condition of restarting the engine further reduces the likelihood of unintended movement of the vehicle, as engine torque cannot be transmitted while the clutch is disengaged.

In a third example, the control module 160 is configured (e.g. programmed) to start the engine 110 if, when the transmission 130 is in-gear and the brakes 150 are applied, the clutch 120 is in the partially engaged configuration, the clutch pedal 120 is moved in the direction of the released position and the brake pressure is sufficient to impede (e.g. prevent) vehicle movement. Taking the brake pressure into account enables the engine 110 to be safely restarted, with reduced likelihood of unintended vehicle movement, even when the clutch 120 is in the partially engaged configuration in which engine torque may be transferred to the wheels 140.

In any of the first, second or third examples, movement of the clutch pedal towards the released position can be detected by monitoring the clutch pedal position and/or speed of movement based on one or more outputs from the clutch pedal sensor 124. For example, the control module 160 may compare the instantaneous clutch pedal position to a previously measured clutch pedal position and determine that the clutch pedal 122 has moved towards the released position if the difference between the instantaneous clutch pedal position and the previous clutch pedal position is greater than a threshold. The previous clutch pedal position may be a value stored in a memory of the control module 160. For example, the control module 160 may iteratively or continuously update a stored value of the most depressed position of the clutch pedal 122. Comparison of the instantaneous clutch pedal position with the most depressed position of the clutch pedal 122, for example as achieved since auto-stopping of the engine 110, may enable variations in, for example, driver strength and bodily dimensions to be taken into account when determining whether the clutch pedal 122 has moved towards the released position.

Additionally or alternatively, the control module 160 may determine that the clutch pedal 122 is moving towards the released position if the speed of movement of the clutch pedal 122 in the direction of the released position is greater than a threshold.

In the third example, the control module 160 may determine that the brake pressure is sufficient to impede (e.g. prevent) vehicle movement by calculating or estimating the forces acting on the vehicle 100 (including gravity, braking torque and driving torque), for example by taking into account the vehicle mass (which may be measured, estimated or known), the vehicle orientation (for example, the gradient or slope of a surface on which the vehicle is situated, which may be measured, estimated or known), the braking torque (which may be measured, estimated or calculated, for example, based on the pressure in the hydraulic brake lines), and the clutch torque transfer which would occur if the engine were restarted (which may be measured, estimated or calculated, for example based on the instantaneous clutch pedal position and/or the clutch configuration).

In any of the first, second or third examples, the control module 160 may also be configured (e.g. programmed) to start the engine 110 in response to alternative triggers, for example under different conditions. For example, the control module 160 may also be configured (e.g. programmed) to start the engine 110, when the transmission is in-gear, in response to determining that the brake is being released (e.g. due to reduced pressure on the brake pedal).

Figure 2:
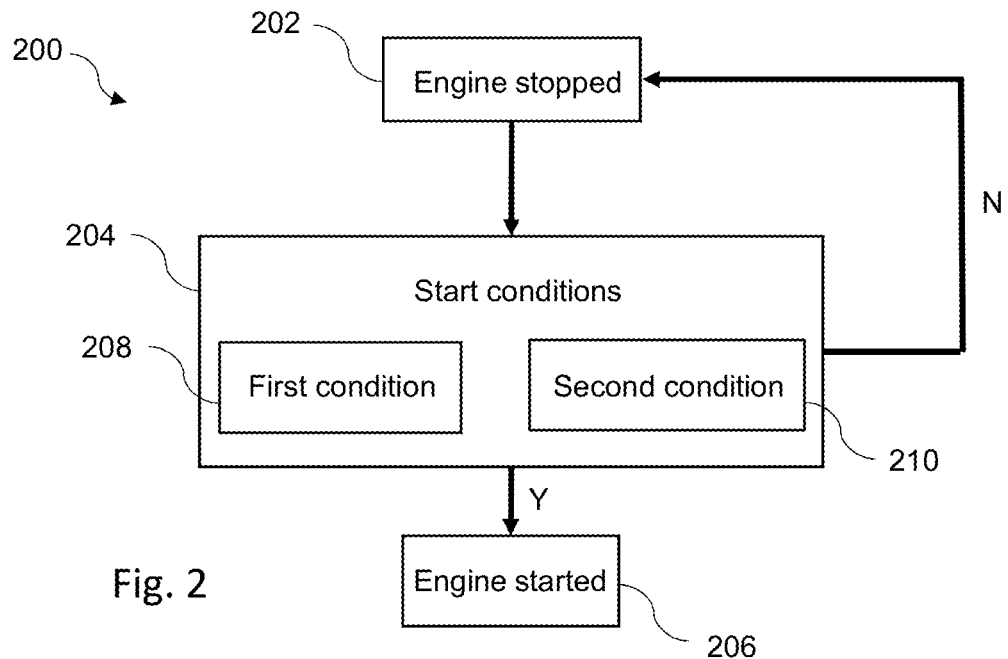
FIG. 2 is a flowchart of a first example method.

FIG. 2 shows an example method 200 of operating the engine 110 of FIG. 1. The method 200 comprises step 202 at which the engine is in a stopped state (e.g. an automatically stopped state such as a state following the meeting of at least one predetermined stop condition) and the transmission is in-gear. The engine will remain in the stopped state until one or more specific predetermined engine start conditions are met—these are set forth in step 204. If one of the predetermined engine start conditions are met then the method advances to step 206 at which the engine is started (as the engine has been in a stopped state, at step 202, step 206 may therefore comprise re-starting the engine). As stated above, in one example the engine, at step 202, may be in the stopped state as a result of auto-stopping, e.g. in an auto-stopped state, and therefore method 200 may be a method of operating an engine while the engine is operating in a stop-start mode, in which the engine may be selectively stopped and started (e.g. by the control module 160), according to whether one or more (stop or start) conditions exist. If one of the two start conditions (step 204) are met then the engine is started.

At step 204 two separate engine start conditions are used to determine if the engine should be restarted. If neither of these conditions are met then the method remains at step 202 with the engine remaining stopped (this is indicated by pathway 'N' in the flowchart). The first of these conditions is indicated as step 208 and comprises a determination of whether movement of the clutch pedal towards the released position is detected while the transmission remains in-gear and the brake is applied. If it is determined (e.g. by the control module 160, in one example utilising signals from the brake sensor and/or the clutch pedal sensor and/or a transmission sensor) that this is the case then the method advances to step 206 at which the engine is restarted (this is indicated as pathway 'Y' in the flowchart). Otherwise, the method remains at step 202 (with the engine stopped) until this condition or the other condition is met. The second of the predetermined start conditions is indicated at step 210 and comprises a determination of whether the brake pedal of the vehicle is released while the transmission is in-gear. If it is determined (e.g. by the control module 160, in one example utilising signals from the brake sensor and/or the transmission sensor) that this is the case then the method advances to step 206 at which the engine is restarted (again, this is indicated as pathway 'Y' in the flowchart). Otherwise, the method remains at step 202 (with the engine stopped) until this condition or the other condition is met.

Figure 3:
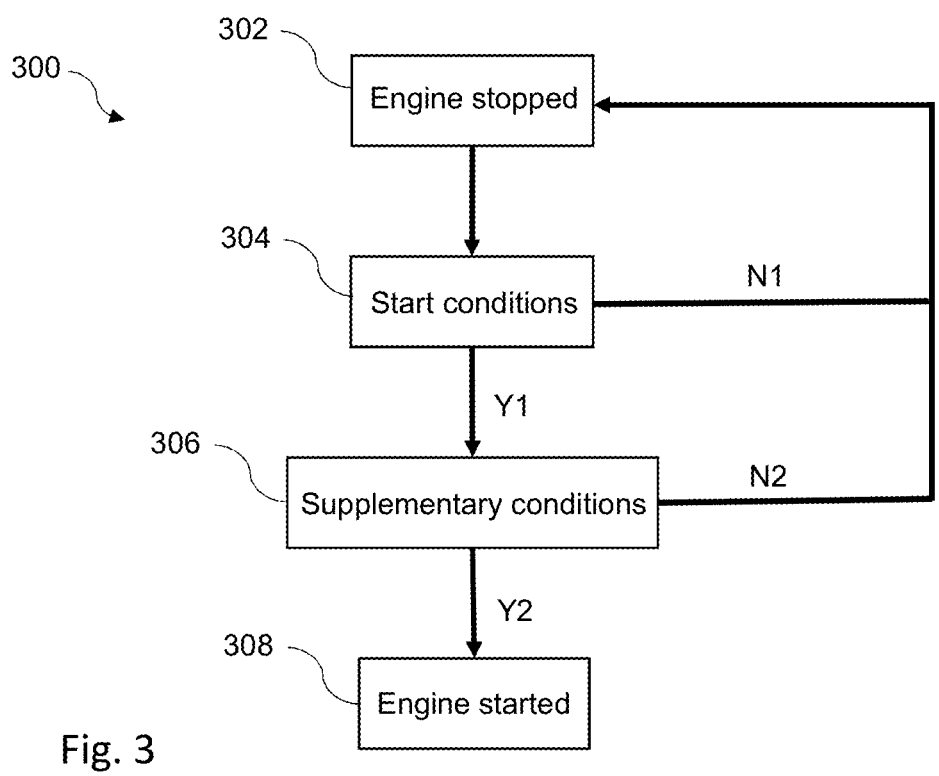
FIG. 3 is a flowchart of a second example method.

FIG. 3 shows an alternative example method 300 of operating the engine 110 of FIG. 1. The method 300 comprises step 302 at which the engine is in a stopped state (e.g. an automatically stopped state such as a state following the meeting of at least one predetermined stop condition) and the transmission is in-gear. The engine will remain in the stopped state until one or more specific predetermined engine start conditions are met—these are set forth in step 304. If one of the predetermined engine start conditions are met then the method advances to step 306 at which a supplementary predetermined engine start condition of the vehicle is checked. If the supplementary predetermined start condition is met then the method advanced to step 308 at which the engine is started (as the engine has been in a stopped state, at step 302, step 308 may therefore comprise re-starting the engine).

At step 304 two separate engine start conditions are used to determine if the engine should be restarted, although for simplicity these are now shown in one combined method step. If neither of these conditions are met then the method remains at step 302 with the engine remaining stopped (this is indicated as pathway 'N1' in the flowchart). The first of these conditions comprises a determination of whether movement of the clutch pedal towards the released position is detected while the transmission remains in-gear and the brake is applied; the second of these conditions comprises a determination of whether the brake pedal of the vehicle is released while the transmission is in-gear. If one of these conditions is met, the method moves to step 306 at which the supplementary start condition is checked (this is indicated as pathway 'Y1' in the flowchart). The supplementary start condition comprises a determination of whether the clutch is in the fully disengaged configuration (for example, based on an output from the clutch sensor, such as the clutch slave cylinder sensor). If it is determined that the supplementary condition is met, then the method advances to step 308, at which the engine is restarted (this is indicated as pathway 'Y2' in the flowchart). Otherwise, the method remains at step 302 (with the engine stopped) until this condition or the other condition is met (this is indicated as pathway 'N2' in the flowchart).

Figure 4:
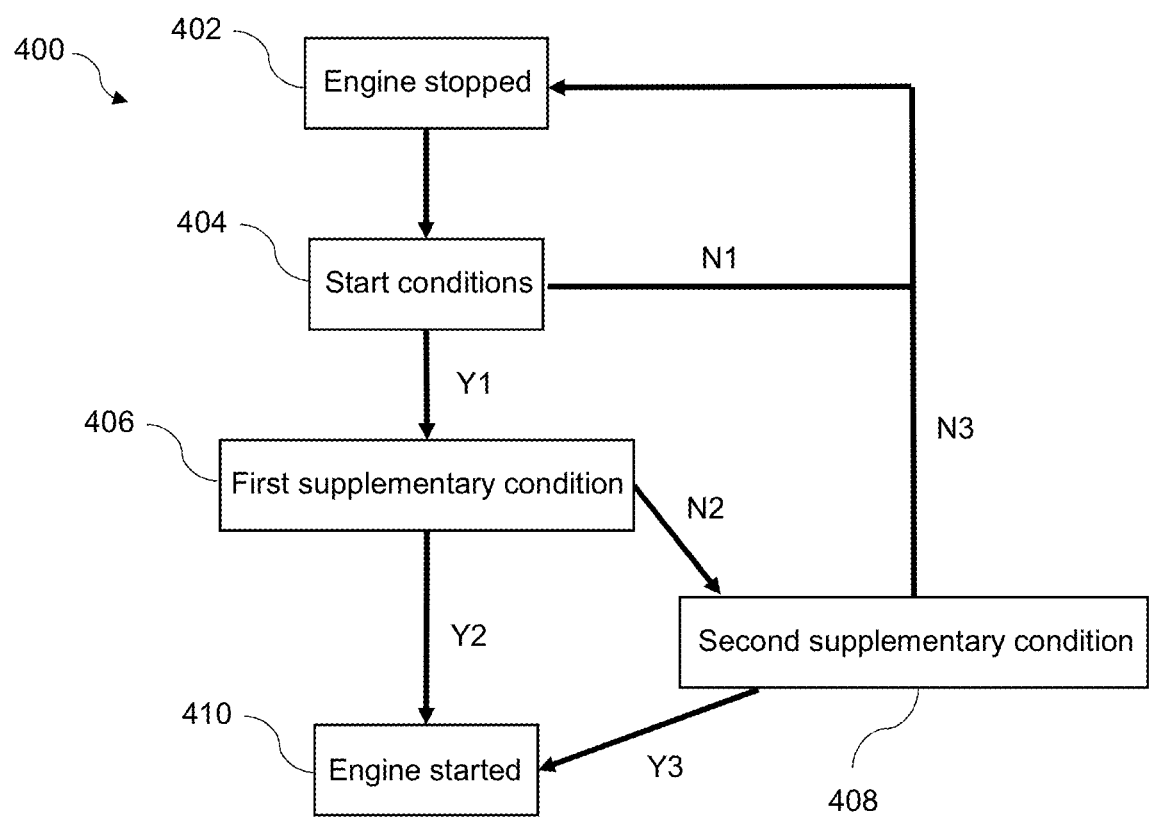
FIG. 4 is a flowchart of a third example method.

FIG. 4 shows an example method 400 of operating the engine 110 of FIG. 1. The method 400 comprises step 402 at which the engine is in a stopped state (e.g. an automatically stopped state such as a state following the meeting of at least one predetermined stop condition) and the transmission is in-gear. The engine will remain in the stopped state until one or more specific predetermined engine start conditions are met—these are set forth in step 404. If one of the predetermined engine start conditions are met then the method advances to step 406 at which a first supplementary predetermined engine start condition of the vehicle is checked. If the first supplementary predetermined start condition is met then the method advances to step 410 at which the engine is started (as the engine has been in a stopped state, at step 402, step 410 may therefore comprise re-starting the engine). If the first supplementary predetermined start condition is not met, then the method advances to step 408 at which a second supplementary predetermined engine start condition of the vehicle is checked. If the second supplementary predetermined start condition is met then the method advanced to step 410 at which the engine is started.

At step 404 two separate engine start conditions are used to determine if the engine should be restarted, although for simplicity these are again shown in one combined method step. If neither of these conditions are met then the method remains at step 402 with the engine remaining stopped (this is indicated as pathway 'N1' in the flowchart). The first of these conditions comprises a determination of whether movement of the clutch pedal towards the released position is detected while the transmission remains in-gear and the brake is applied; the second of these conditions comprises a determination of whether the brake pedal of the vehicle is released while the transmission is in-gear. If one of these conditions is met, the method moves to step 406 at which the first supplementary start condition is checked (this is indicated as pathway 'Y1' in the flowchart). The first supplementary start condition comprises a determination of whether the clutch is in the fully disengaged configuration (for example, based on an output from the clutch sensor, such as the clutch slave cylinder sensor). If it is determined that the supplementary condition is met, then the method advances to step 410, at which the engine is restarted (this is indicated as pathway 'Y2' in the flowchart). Otherwise, the method moves to step 408 at which the second supplementary start condition is checked (this is indicated as pathway 'N2' in the flowchart). The second supplementary start condition comprises a determination of whether the brake torque applied by the brakes (for example, based on the pressure in a hydraulic brake line) is sufficient to impede (e.g. prevent) movement of the vehicle if the engine is restarted, based on the instantaneous clutch configuration (e.g., the instantaneous clutch torque transfer capacity). If it is determined that the supplementary condition is met, then the method advances to step 410, at which the engine is restarted (this is indicated as pathway 'Y3' in the flowchart). Otherwise, the method remains at step 402 (with the engine stopped) until this condition or the other condition is met (this is indicated as pathway 'N3' in the flowchart).

Figure 5:
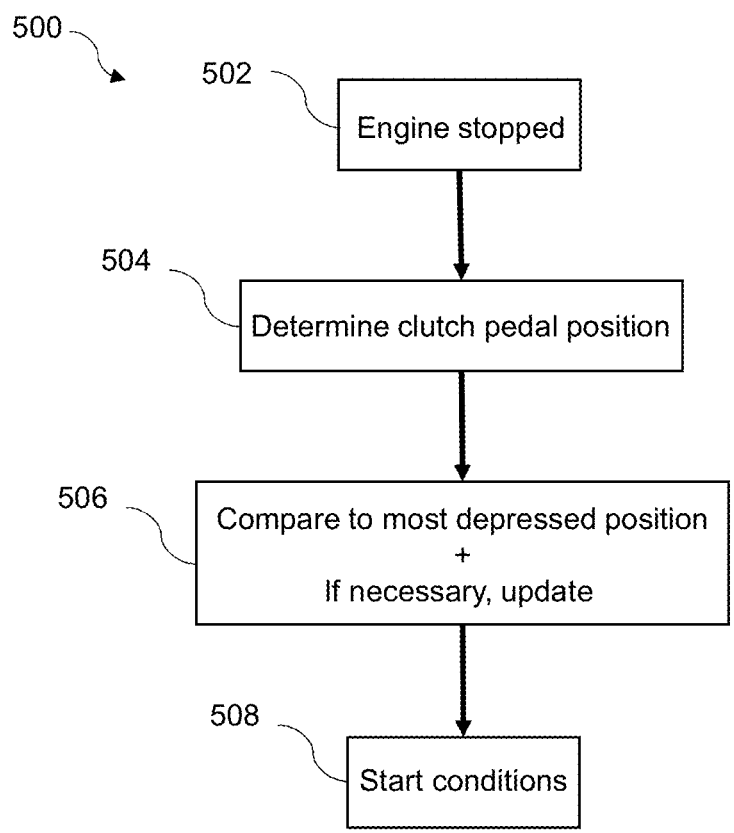
FIG. 5 is a flowchart of an optional part of the methods of FIG. 2, 3 or 4.

FIG. 5 shows an optional part of the methods 200, 300 or 400 in further detail, which may occur prior to the assessment of the predetermined engine start conditions 204, 304 or 404. The method portion 500 comprises step 502 at which the engine is in a stopped state (e.g. an automatically stopped state such as a state following the meeting of at least one predetermined stop condition) and the transmission is in-gear. The engine will remain in the stopped state until one or more specific predetermined engine start conditions are met, as explained hereinabove, at step 508. Prior to assessment of whether the predetermined engine start conditions are met, the method comprises step 504 of determining the instantaneous clutch pedal position, for example based on an output from the clutch pedal sensor. Following determining the instantaneous clutch pedal position, the method comprises step 506 of comparing the instantaneous clutch pedal position to the most depressed clutch pedal position stored in a memory of the control module. At step 506, if the instantaneous clutch pedal position is more depressed (e.g., closer to the maximum possible extent of travel of the clutch pedal towards the depressed position) than the most depressed clutch pedal position stored in the memory, or no most depressed clutch pedal position value is currently stored in the memory, the value of the most depressed clutch pedal position stored in the memory is set to the instantaneous clutch pedal position. Alternatively, if the instantaneous clutch pedal position is equally or less depressed than the most depressed clutch pedal position stored in the memory, the value of the most depressed clutch pedal position stored in the memory is not changed. The method then moves to step 508 (corresponding to steps 204, 304 or 404 of methods 200, 300 and 400) for determining whether the predetermined engine start conditions are met, during which calculations the most depressed clutch pedal position may be used. In this way, the value of the most depressed clutch pedal position stored in the memory may be iteratively updated.

FIG. 6 shows an example non-transitory machine-readable storage medium 600 and a processor 602. The medium 600 is encoded with instructions 604 that are executable by the processor 602. When executed by the processor, the instructions cause the processor to perform the methods 200, 300 or 400 (and optionally method portion 500) as described above with reference to FIGS. 2, 3, 4 and 5. For example, the instructions 604 comprise instructions 606 to cause the processor 602 to start an engine of a vehicle if either a brake pedal of the vehicle is released (while the transmission is in-gear) or the clutch pedal is moved towards the released position (while the transmission is in-gear and the brake is applied). An electronic control unit of a vehicle may comprise the processor.

It will be understood that the disclosure is not limited to the embodiments described above and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of controlling an engine of a vehicle having a stop-in-gear stop-start system, the vehicle comprising:
 a manual transmission having at least one in-gear position;
 a clutch interposed between the engine and the transmission, the clutch being operable in:
  a fully engaged clutch configuration in which the engine is driveably connected to the transmission by the clutch for the transfer of torque;
  a partially engaged clutch configuration in which the engine is partially connected to the transmission by the clutch, the clutch having a limited torque transfer capacity in the partially engaged clutch configuration; and
  a fully disengaged clutch configuration in which the engine is not driveably connected to the transmission;
 a driver-operable clutch pedal operably connected to the clutch for selecting the clutch configuration and movable between:
  a depressed position in which the clutch is in the fully disengaged configuration;
  a released position in which the clutch is in the fully engaged configuration; and a pressed position, intermediate the depressed and released positions, in which the clutch is in the partially engaged configuration;
a brake applicable to exert a braking torque to impede movement of the vehicle;
a clutch pedal sensor operable to measure a parameter indicative of clutch pedal position and/or movement;
a brake sensor operable to measure a parameter indicative of brake application;
a transmission sensor operable to measure a parameter indicative of the transmission position; and
a control module;
wherein the method comprises:
the control module determining that the brake is being applied, based on an output from the brake sensor, and that the transmission is in an in-gear position, based on an output from the transmission sensor; and,
while the brake is applied and the transmission is in the in-gear position, the control module causing the engine to start in response to detecting movement of the clutch pedal towards the released position based on an output from the clutch pedal sensor;
wherein detecting movement of the clutch pedal towards the released position comprises comparing the clutch pedal position, determined based on the output from the clutch pedal sensor, to a previous clutch pedal position, and determining that a difference between the clutch pedal position and the previous clutch pedal position exceeds a threshold.

2. The method according to claim 1, wherein the vehicle comprises a clutch sensor operable to measure a parameter indicative of the clutch configuration and the method comprises:
the control module determining that the clutch is in the fully disengaged clutch configuration based on an output from the clutch sensor; and,
while the brake is applied, the transmission is in an in-gear position and the clutch is in the fully disengaged clutch configuration, the control module causing the engine to start in response to detecting movement of the clutch pedal towards the released position based on the output from the clutch pedal sensor.

3. The method according to claim 1, wherein the vehicle comprises a clutch sensor operable to measure a parameter indicative of the clutch configuration and the method comprises:
the control module determining that the clutch is in the partially engaged clutch configuration based on an output from the clutch sensor and that the braking torque is sufficient to impede movement of the vehicle; and,
while the brake is applied, the transmission is in an in-gear position, the clutch is in the partially engaged clutch configuration and the braking torque is sufficient to impede movement of the vehicle, the control module causing the engine to start in response to detecting movement of the clutch pedal towards the released position based on the output from the clutch pedal sensor.

4. The method according to claim 3, comprising the control module taking into account one or more of a hydraulic brake pressure, the clutch pedal position, the clutch configuration, an instantaneous clutch torque transfer capacity of the clutch, a vehicle mass and a vehicle orientation in determining that the braking torque is sufficient to impede movement of the vehicle.

5. The method according to claim 2, wherein the clutch sensor is operable to measure a parameter indicative of the clutch torque transfer capacity.

6. The method according to claim 2, wherein movement of the clutch is actuated by a clutch slave cylinder and the clutch sensor is a clutch slave cylinder sensor operable to measure a parameter indicative of hydraulic pressure in the clutch slave cylinder.

7. The method according to claim 1, wherein the previous clutch pedal position is the most depressed clutch pedal position achieved since the engine was most recently stopped.

8. The method according to claim 1, wherein detecting movement of the clutch pedal towards the released position comprises determining that a speed of movement of the clutch pedal towards the released position, based on the output from the clutch sensor, exceeds a threshold.

9. A computer program comprising instructions to cause a control module of a vehicle to carry out the method according claim 1.

10. A non-transitory computer-readable medium storing, or a data carrier signal carrying, the computer program according to claim 9.

11. A control module for controlling an engine of a vehicle having a stop-in-gear stop-start system, the control module being configured to:
determine, based on an output from a brake sensor of the vehicle, that a brake of the vehicle is being applied, and, based on an output from a transmission sensor of the vehicle, that a transmission of the vehicle is in an in-gear position; and
while the brake is applied and the transmission is in the in-gear position, causing the engine to start in response to detecting movement of a clutch pedal of the vehicle towards a released position based on an output from a clutch pedal sensor of the vehicle, wherein detecting movement of the clutch pedal towards the released position comprises comparing a clutch pedal position, determined based on the output from the clutch pedal sensor, to a previous clutch pedal position, and determining that a difference between the clutch pedal position and the previous clutch pedal position exceeds a threshold.

12. A vehicle having a stop-in-gear stop-start system, the vehicle comprising:
an engine;
a manual transmission having at least one in-gear position;
a clutch interposed between the engine and the transmission, the clutch being operable in:
a fully engaged clutch configuration in which the engine is driveably connected to the transmission by the clutch for the full transfer of torque;
a partially engaged clutch configuration in which the engine is partially connected to the transmission by the clutch, the clutch having a limited torque transfer capacity in the partially engaged clutch configuration; and
a fully disengaged clutch configuration in which the engine is not driveably connected to the transmission;
a driver-operable clutch pedal operably connected to the clutch for selecting the clutch configuration and movable between:
a depressed position in which the clutch is in the fully disengaged configuration;

a released position in which the clutch is in the fully engaged configuration; and a pressed position, intermediate the depressed and released positions, in which the clutch is in the partially engaged configuration;

a brake applicable to exert a braking torque to impede movement of the vehicle;

a clutch pedal sensor operable to measure a parameter indicative of clutch pedal position and/or movement;

a brake sensor operable to measure a parameter indicative of brake application;

a transmission sensor operable to measure a parameter indicative of the transmission position; and a control module configured to:

determine that the brake is being applied, based on an output from the brake sensor, and that the transmission is in an in-gear position, based on an output from the transmission sensor; and while the brake is applied and the transmission is in the in-gear position, cause the engine to start in response to detecting movement of the clutch pedal towards the released position based on an output from the clutch pedal sensor, wherein detecting movement of the clutch pedal towards the released position comprises comparing a clutch pedal position, determined based on the output from the clutch pedal sensor, to a previous clutch pedal position and determining that a difference between the clutch pedal position and the previous clutch pedal position exceeds a threshold.

13. The vehicle according to claim 12, wherein the clutch pedal is movable from 0% to 100% of a maximum clutch pedal travel distance, the released position corresponding to a position of the clutch pedal which is greater than or equal to 0% and less than a first threshold percentage of the maximum clutch pedal travel distance, the pressed position corresponding to a position of the clutch pedal which is greater than or equal to the first threshold percentage and less than a second threshold percentage of the maximum clutch pedal travel distance, and the depressed position corresponding to a position of the clutch pedal which is greater than or equal to the second threshold percentage and no greater than 100% of the maximum clutch pedal travel distance, the second threshold percentage being greater than the first threshold percentage.

14. The vehicle according to claim 13, wherein the first threshold percentage is from about 5% to about 20% and the second threshold percentage is from about 70% to about 80%.

15. The vehicle according to claim 12, wherein the vehicle is a motor vehicle.

16. The vehicle according to claim 15, wherein the motor vehicle is a car, van or truck.

17. The vehicle according to claim 12, further comprising a clutch sensor operable to measure a parameter indicative of the clutch configuration.

\* \* \* \* \*